Jan. 27, 1959     E. R. PRICE     2,871,064
AUTOMATIC BRAKING SYSTEM
Filed Aug. 21, 1956
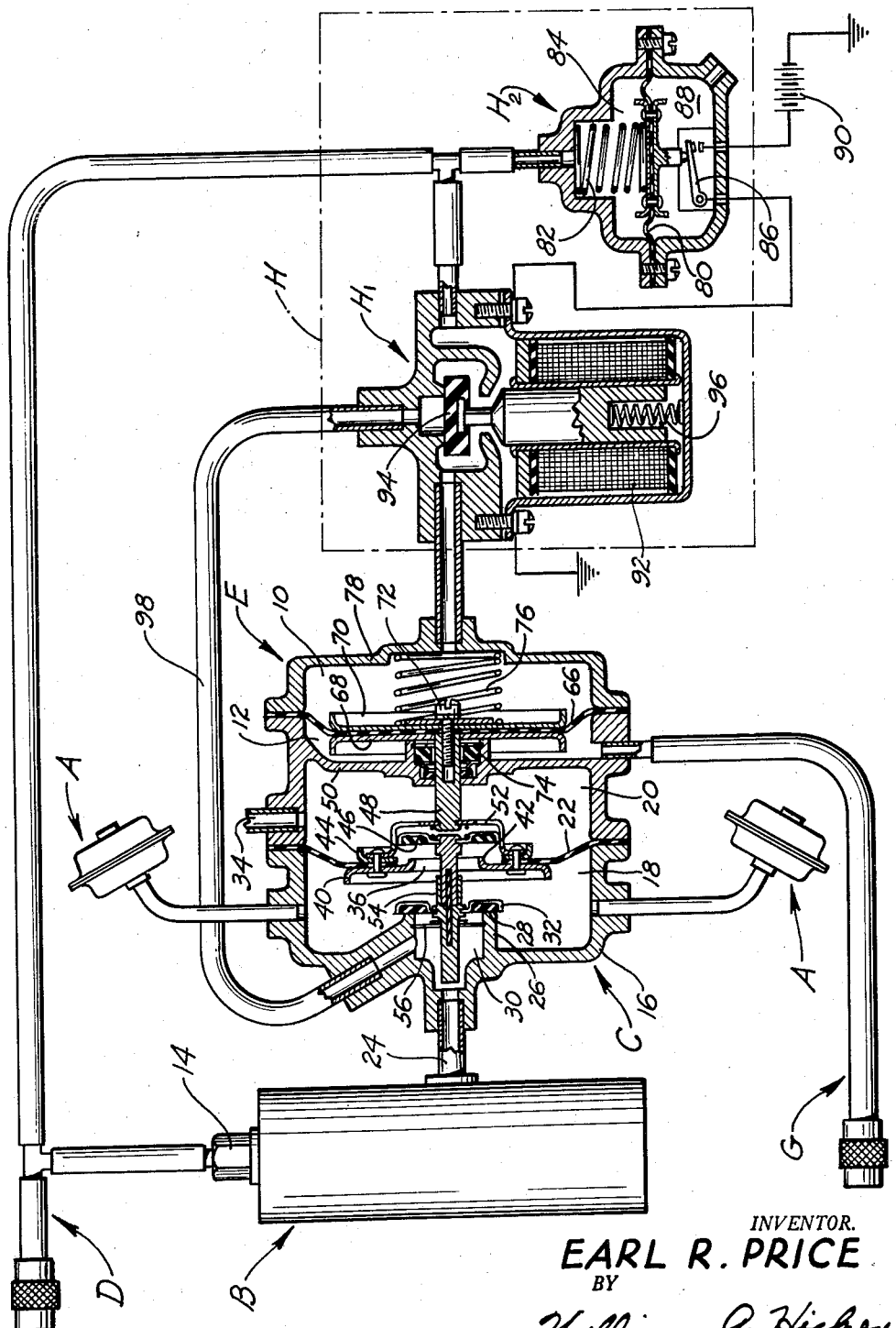
INVENTOR.
EARL R. PRICE
BY
William O. Hickey
ATTORNEY.

United States Patent Office 2,871,064
Patented Jan. 27, 1959

2,871,064

AUTOMATIC BRAKING SYSTEM

Earl R. Price, South Bend, Ind., assignor to Bendix Aviation Corporation, South Bend, Ind., a corporation of Delaware Application August 21, 1956, Serial No. 605,405

4 Claims. (Cl. 303—31)

The present invention relates to pneumatic actuated remote control systems; and more particularly to pneumatic braking systems for tractor-trailer vehicles and the like.

An object of the present invention is the provision of a new and improved braking system for a train of separable vehicles wherein a normally energized interconnecting service line supplies pneumatic energy to a reservoir on a controlled vehicle and a normally energized interconnecting control line is utilized to actuate valving interpositioned between the reservoir and a brake applying fluid pressure motor; said system being constructed such that the brakes of the controlled unit are applied either upon de-energization of the control line, or the de-energization of the service line below a predetermined level.

Another object of the invention is the provision of a new and improved actuating system for a trailer brake applying fluid pressure motor, said system comprising: a trailer mounted reservoir of energy; control means interconnected between said reservoir and the brake applying motor; a movable element in said control means permitting energy flow from the reservoir to the motor when in a first position to apply the brakes, and de-energizing said motor when in a second position to release the brakes, said movable element being biased to its second position; first motor means for urging the movable element to its first position when energized; second motor means urging said movable element to its second position when energized; a normally energized control line connected to said second means; a normally energized supply line connected to the reservoir and the first motor means; means in the supply line preventing back-flow of energy from the reservoir; sensing means becoming triggered upon de-energization of the supply line below a predetermined level; and disconnect means in the supply line for disconnecting the supply line from and connecting the reservoir to said first motor means upon triggering of the sensing means.

A still further object of the invention is the provision of a new and improved vacuum suspended actuating system for a trailer brake applying fluid pressure motor comprising, a reservoir mounted on the trailer, a control valve interconnecting the reservoir and the brake applying motor, a fluid pressure motor having opposed fluid pressure chambers divided by a movable wall for actuating the control valve, a normally vacuum suspended control line communicating with one of the chambers, a vacuum supply line communicating with the reservoir, check valve means for preventing pressure from entering the reservoir through the supply line, and means normally connecting the vacuum service line to the other of said opposed chambers to effect a normal vacuum submerged condition for said fluid pressure motor wherein said valve closes off communication between the brake motor and the reservoir, said means being adapted to close off communication between the service line and said other of said chambers and establish communication between said reservoir and said other chamber when the service line becomes de-energized below a predetermined level.

The invention resides in certain constructions, and combinations and arrangement of parts, and further objects and advantages will be apparent to those skilled in the art to which the invention relates from the following description of the preferred embodiment described with reference to the accompanying drawing forming a part of this specification, and in which the single figure of the drawing is a generally schematic view, with parts in section, of a portion of a braking system embodying principles of the present invention.

The braking system shown in the drawing is of a type adapted to be used on a trailer of a tractor-trailer combination vehicle. The system generally comprises a pair of vacuum actuated, brake applying fluid pressure motors (or dishpans) A, to which vacuum is communicated from a reservoir B by means of a control valve C. Vacuum is supplied to the reservoir B from the tractor (not shown) by means of a vacuum supply line D. The control valve C is operated by means of a normally vacuum suspended double acting fluid pressure actuated control motor E having opposed chambers 10 and 12 normally energized with vacuum. Chamber 10 is supplied by the vacuum supply line D, and chamber 12 is supplied by a normally vacuum suspended control line G leading to the tractor.

The fluid pressure motor E is so arranged that a pressure rise in the control line G applies the brakes of the vehicle. The brakes of the trailer will normally be applied by bleeding air into the control line G through an operator operated control valve (not shown) mounted on the tractor; and automatically in an emergency upon a leak or break in the control line G. This will be true so long as chamber 10 is energized with vacuum. Means H is provided in the present invention to assure a vacuum supply to chamber 10 even upon failure of the vacuum supply line D.

The dishpans A are of well known construction and will not further be described. Maximum service vacuum is maintained in the reservoir B at all times by means of a check valve 14 in the supply line D which closes off the reservoir B whenever vacuum in the supply line D decreases below that existing in the reservoir.

As previously indicated, operation of the dishpans A is regulated by the control valve C. Control valve C generally comprises a body member 16 having a pair of opposed chambers 18 and 20 separated by a movable wall or diaphragm 22. Vacuum from the reservoir B is conducted to control chamber 18 by the vacuum inlet tube 24. An internal annular boss 26 having a valve seat 28 on the end thereof projects into the control chamber 18 to form a small vacuum chamber 30. Vacuum flow into the chamber 18 is controlled by a poppet 32 adapted to bear against valve seat 28; and air pressure is continually admitted to chamber 20 through inlet tube 34.

The diaphragm 22 is provided with an opening 36 therethrough opposite the vacuum valve seat 28 to permit atmospheric pressure from air chamber 20 to be admitted to the control chamber 18. An annular plate 40 having a valve seat 42, surrounds the central opening of the diaphragm 22 and is affixed thereto by means of rivets and a back-up plate 44. The dishpans A are connected to the control chamber 18, and the flow of air into the control chamber 18 is controlled by an atmospheric poppet 46. Actuation of the poppet is achieved by means of a valve stem 48 which extends externally of the end wall 50 of the valve chamber and which is attached to the diaphragm back-up plate 44 by a spider 52. The spider 52 surrounds and guides the atmospheric poppet 46, and the poppets 32 and 46 are affixed to another valve stem 54 which in turn is guided adjacent the poppet 32 by means of a coil spring 56. Outward movement of valve stem 48 causes the annular diaphragm plate 40 to pick up the atmospheric poppet 46 thereby closing off atmospheric communication with the control chamber 18, and to thereafter lift the poppet 32 from its seat to admit vacuum to the control chamber.

The control valve C is adapted to be controlled remotely from the tractor of the vehicle by means of the fluid pressure motor E integrally attached to the end wall 50 of the control valve. As previously indicated, the fluid pressure motor E has a pair of opposed chambers 12 and 10 separated by a movable wall or diaphragm 66. The diaphragm 66 is attached to the valve stem 48 as by stiffening plates 68 and 70 and machine screws 72, and a vacuum seal 74 is provided around the stem 48. Supply vacuum is continually admitted to the rearwardly positioned chamber 10 as will later be described, and actuation of the motor is effected by a normally vacuum submerged control line G introduced into the forward chamber 12. Upon bleeding air into the control line G, a differential is produced across diaphragm 66 and the valve stem 48 is moved rearwardly in the manner above described. A spring 76 is positioned between the diaphragm 66 and the end wall 78 of the motor to return the valve to its forward or normal position.

As previously mentioned vacuum is continually supplied to the rearmost opposed diaphragm chamber to keep it energized at all times, such that the motor E will be actuated whenever atmospheric pressure is bled to the forward opposed diaphragm chamber 12. This is accomplished by means of a three way solenoid valve $H_1$, which in the position shown normally communicates vacuum from the service line D to the rearmost chamber 10.

A sensing device $H_2$ is also connected to the service line D to detect de-energization, or vacuum fall off, below a predetermined level. The sensing device $H_2$ shown comprises a diaphragm switch having a diaphragm 80 one side of which is subjected to the service vacuum and the other side of which is exposed to atmospheric pressure or ambient conditions. A spring 82 is positioned in the vacuum chamber 84 of the switch, and an electrical switch 86 is positioned in the atmospheric chamber 88 of the switch in such manner that the switch 86 will be closed by the action of spring 82 when the service vacuum decreases below a predetermined level. Because diaphragm 80 is interpositioned between the service vacuum line D and ambient conditions, the predetermined energy level at which switch 86 is actuated or triggered will be an absolute level not variable or dependent upon other conditions of the system. Upon triggering of the switch 86, an electrical circuit is established from battery 90 to ground through coil 92 of the solenoid valve $H_1$. Valve 94 normally held in the first position shown by means of spring 96, is thereupon snapped into its second position closing off communication between opposed motor chamber 10 and the service line D, and establishing communication between chamber 10 and reservoir B through line 98 and vacuum chamber 30. Motor E is thereupon energized with full vacuum and a complete application of the brakes can be obtained if atmospheric pressure is admitted to motor chamber 12.

As previously indicated, the system shown in the drawing is a vacuum submerged system in which the service line D and control G are normally energized with vacuum of the same intensity. It is a characteristic of such systems, that a small leak somewhat in the system can travel through open valving in the tractor and lower the vacuum in both lines D and G substantially equally. Should this occur in the system shown in the drawing, motor chambers 12 and 10 would become pressurized by equal amounts until the previously referred to predetermined absolute level at which sensing device $H_2$ is tripped. Upon tripping of the sensing device, full vacuum from the reservoir is applied to motor chamber 10 to provide a differential pressure across its diaphragm 66 and thereby automatically partially apply the brakes of the trailer. Should this not be fast enough to meet an emergency, full atmospheric pressure can be applied to motor chamber 12 through control line G by conventional valving in the tractor of the vehicle. It will also be observed that the embodiment shown in the drawing automatically and under all conditions assures an emergency application of the trailer's brakes whenever failure of the interconnecting lines occurs.

From the foregoing description of the preferred embodiment of the invention, it will be apparent that the objects heretofore enumerated as well as others have been accomplished. While the preferred embodiment has been shown and described in detail, the invention is not limited to the particular construction shown or described, and it is my intention to cover hereby all adaptations, modifications and uses thereof which come within the practice of those skilled in the art to which the invention relates.

I claim:

1. In a pneumatic control system for automotive braking and the like: a fluid pressure motor actuated by the application of a pressure differing from atmosphere; a normal but fluctuable source of said pressure differing from atmosphere; a reservoir supplied by said fluctuable source of said pressure differing from atmosphere; check valve means interpositioned between said reservoir and said source for closing off communication therebetween when the intensity of said source falls below that existing in said reservoir; a control valve having a movable element which opens and closes communication between said reservoir and said fluid pressure motor; a fluid pressure actuated control motor having a movable wall therein which operates said movable element and which movable wall separates opposing pressure chambers in said motor; a control line communicating with one of said opposing chambers; a normal supply line for communicating the other of said opposing chambers with said source; said control motor being arranged to cause said movable element to close communication between said reservoir and said first mentioned fluid pressure motor when pressures of substantially equal intensities exist in said opposing chambers, and to cause said movable element to open communication between said reservoir and said fluid pressure motor when atmospheric pressure is bled into said one opposing chamber and said differing pressure exists in said other opposing chamber; and means for communicating said normal supply line to said other opposing chamber when the differential pressure between said normal supply line and atmosphere exceeds a predetermined amount and for communicating said reservoir to said other oposing chamber when said differential pressure is below said predetermined amount.

2. In a pneumatic control system for automotive braking and the like: a fluid pressure motor actuated by the application of a pressure differing from atmosphere; a normal but fluctuable source of said pressure differing from atmosphere; a reservoir supplied by said fluctuable source of said pressure differing from atmosphere; check valve means interpositioned between said reservoir and said source for closing off communication therebetween when the intensity of said source falls below that existing in said reservoir; a control valve having a movable element which opens and closes communication between said reservoir and said fluid pressure motor; a fluid pressure actuated control motor having a movable wall therein which operates said movable element and which movable wall separates opposing pressure chambers in said motor; a control line communicating with one of said opposing chambers; a normal supply line for communicating the other of said opposing chambers with said source; said control motor being arranged to cause said movable element to close communication between said reservoir and said first mentioned fluid pressure motor when pressures of substantially equal intensities exist in said opposing chambers, and to cause said movable element to open communication between said reservoir and said fluid pressure motor when atmospheric pressure is bled into said one opposing chamber and said differing pressure exists in said other opposing chamber; valve means having a movable two position control element, said valve means communicating said normal supply line to said other opposed chamber when said movable element is in one position, and communicating said reservoir to said other opposed chamber when said movable element is in its other position; and means powered by an energy supply which is independent of the above fluid pressure system for moving said movable element from said one position to said other position when the pressure differential between said source and atmosphere decreases below a predetermined level.

3. In a pneumatic control system for automotive braking and the like: a normally atmospheric suspended fluid pressure motor actuated by the application of vacuum; a normal but fluctuable source of vacuum; a reservoir supplied by said vacuum source; check valve means interpositioned between said reservoir and said source preventing pressure inflow to said reservoir from said source; a control valve having a movable element which opens and closes communication between said reservoir and said fluid pressure motor; a fluid pressure actuated control motor having a movable wall therein which operates said movable element and which movable wall separates opposing pressure chambers in said motor; a normally vacuum suspended control line communicating with one of said opposing chambers; a normal vacuum supply line for communicating the other of said opposing chambers with said source; said control motor being arranged to cause said movable element to close communication between said reservoir and said first mentioned fluid pressure motor when vacuums of substantially equal intensities exist in said opposing chambers, and to cause said movable element to open communication between said reservoir and said fluid pressure motor when the pressure in said one opposing chamber is greater than in said other opposing chamber; and means for communicating said normal supply line to said other opposing chamber when the differential pressure between said normal supply line and atmosphere exceeds a predetermined amount, and communicating said reservoir to said other opposing chamber when said differential pressure is below said predetermined amount.

4. In a pneumatic control system for automotive braking and the like: a normally atmospheric suspended fluid pressure motor actuated by the application of vacuum; a normal but fluctuable source of vacuum; a reservoir supplied by said vacuum source; check valve means interpositioned between said reservoir and said source preventing pressure inflow to said reservoir from said source; a control valve having a movable element which opens and closes communication between said reservoir and said fluid pressure motor; a fluid pressure actuated control motor having a movable wall therein which operates said movable element and which movable wall separates opposing pressure chambers in said motor; a normally vacuum suspended control line communicating with one of said opposing chambers; a normal vacuum supply line for communicating the other of said opposing chambers with said source; said control motor being arranged to cause said movable element to close communication between said reservoir and said first mentioned fluid pressure motor when vacuums of substantially equal intensities exist in said opposing chambers, and to cause said movable element to open communication between said reservoir and said fluid pressure motor when the pressure in said one opposing chamber is greater than in said other opposing chamber; valve means having a solenoid operated two position control element, said valve means isolating said reservoir from said other opposing chamber while communicating said normal supply line to said other opposing chamber when said solenoid is de-energized, and communicating said reservoir to said other opposing chamber while isolating said supply line from said other opposing chamber when said solenoid is energized, and a pressure switch in series electrical circuit with said solenoid energizing said solenoid when the vacuum in said supply line decreases to a predetermined value.

References Cited in the file of this patent
UNITED STATES PATENTS

| | | |
|---|---|---|
| 2,057,132 | Besler | Oct. 13, 1936 |
| 2,099,453 | Searle | Nov. 16, 1937 |
| 2,213,970 | Stehlin | Sept. 10, 1940 |
| 2,463,172 | Gunderson | Mar. 1, 1949 |

UNITED STATES PATENT OFFICE
CERTIFICATE OF CORRECTION

Patent No. 2,871,064 January 27, 1959

Earl R. Price

It is hereby certified that error appears in the printed specification of the above numbered patent requiring correction and that the said Letters Patent should read as corrected below.

Column 3, line 24, for "wal" read -- wall --; line 66, for "somewhat" read -- somewhere --; column 4, line 52, for "oposing" read -- opposing --.

Signed and sealed this 14th day of July 1959.

(SEAL)

Attest:

KARL H. AXLINE
Attesting Officer

ROBERT C. WATSON
Commissioner of Patents